(12) United States Patent
Nagata

(10) Patent No.: US 9,836,674 B2
(45) Date of Patent: Dec. 5, 2017

(54) CONTROL DEVICE FORMING A PLURALITY OF LATENT IMAGES BASED ON ONE INPUT IMAGE BY USING A LIGHT SOURCE INCLUDING A PLURALITY OF LIGHT EMITTING MEMBERS, AND CONTROL METHOD, IMAGE FORMING APPARATUS, AND NON-TRANSITORY COMPUTER READABLE MEDIUM THEREOF

(71) Applicant: FUJI XEROX CO., LTD., Tokyo (JP)

(72) Inventor: Kenjo Nagata, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/148,263

(22) Filed: May 6, 2016

(65) Prior Publication Data
US 2017/0177981 A1 Jun. 22, 2017

(30) Foreign Application Priority Data
Dec. 18, 2015 (JP) ................................ 2015-247305

(51) Int. Cl.
*G06K 15/12* (2006.01)
*G03G 15/043* (2006.01)

(52) U.S. Cl.
CPC .......... *G06K 15/12* (2013.01); *G03G 15/043* (2013.01)

(58) Field of Classification Search
None
See application file for complete search history.

(56) References Cited

U.S. PATENT DOCUMENTS

| 2009/0080948 A1* | 3/2009 | Takei | G03G 21/1647 399/308 |
| 2009/0129804 A1* | 5/2009 | Shoji | G03G 15/50 399/72 |
| 2010/0300310 A1* | 12/2010 | Kanekiyo | G11B 23/40 101/35 |

FOREIGN PATENT DOCUMENTS

| JP | 2010-139987 A | 6/2010 | |
| JP | 2444850 A2 * | 4/2012 | ......... G03G 15/5041 |

* cited by examiner

*Primary Examiner* — Victor Verbitsky
(74) *Attorney, Agent, or Firm* — Oliff PLC

(57) ABSTRACT

A control device includes an image-formation command section and a first reception section. The image-formation command section commands an image forming section to form multiple latent images based on one input image onto an image bearing member in accordance with different light emission patterns by using a light source including multiple light emitting members, develop the latent images, and output the multiple developed images to a medium. The first reception section receives a designation by a user with respect to one of the multiple light emission patterns after the multiple images are output. Each light emission pattern indicates which of the multiple light emitting members included in the light source is to emit light.

11 Claims, 9 Drawing Sheets

| PATTERN ID | LIGHT-EMITTING-MEMBER ID ||||
| --- | --- | --- | --- | --- |
| | e11 | e12 | ⋯ | e48 |
| P1 | ○ | ○ | ⋯ | × |
| P2 | ○ | ○ | ⋯ | × |
| P3 | × | ○ | ⋯ | × |
| P4 | × | × | ⋯ | ○ |
| ⋮ | ⋮ | ⋮ | ⋮ | ⋮ |

121

FIG. 10
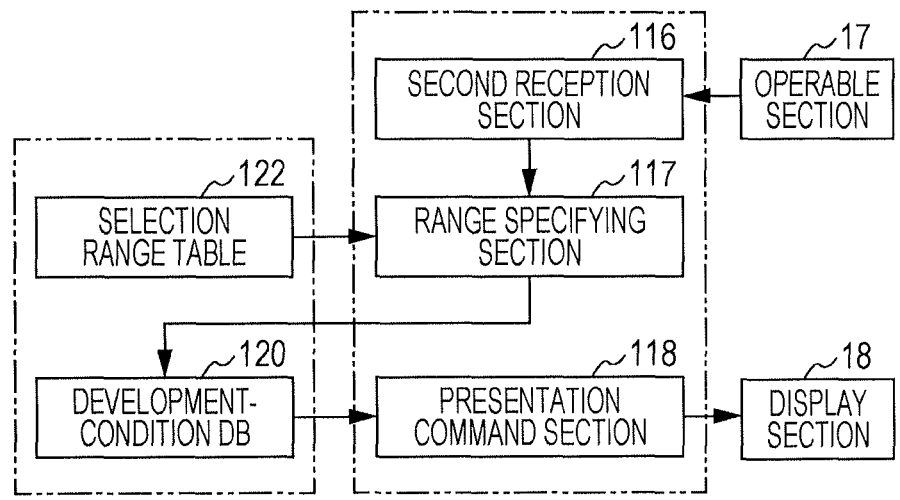
FIG. 11
FIG. 12
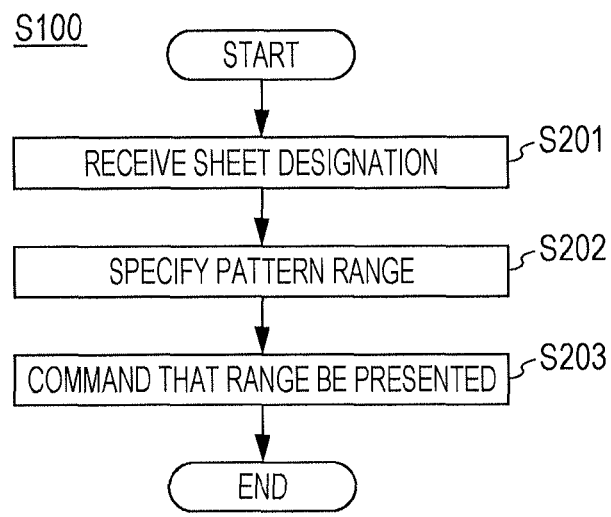

CONTROL DEVICE FORMING A PLURALITY OF LATENT IMAGES BASED ON ONE INPUT IMAGE BY USING A LIGHT SOURCE INCLUDING A PLURALITY OF LIGHT EMITTING MEMBERS, AND CONTROL METHOD, IMAGE FORMING APPARATUS, AND NON-TRANSITORY COMPUTER READABLE MEDIUM THEREOF

CROSS-REFERENCE TO RELATED APPLICATIONS

This application is based on and claims priority under 35 USC 119 from Japanese Patent Application No. 2015-247305 filed Dec. 18, 2015.

BACKGROUND

Technical Field

The present invention relates to control devices, control methods, image forming apparatuses, and non-transitory computer readable media.

SUMMARY

According to an aspect of the invention, there is provided a control device including an image-formation command section and a first reception section. The image-formation command section commands an image forming section to form multiple latent images based on one input image onto an image bearing member in accordance with different light emission patterns by using a light source including multiple light emitting members, develop the latent images, and output the multiple developed images to a medium. The first reception section receives a designation by a user with respect to one of the multiple light emission patterns after the multiple images are output. Each light emission pattern indicates which of the multiple light emitting members included in the light source is to emit light.

BRIEF DESCRIPTION OF THE DRAWINGS

An exemplary embodiment of the present invention will be described in detail based on the following figures, wherein:

FIG. 10 illustrates an example of a selection range table;

FIG. 11 illustrates a functional configuration of a controller according to a modification; and FIG. 12 is a flowchart illustrating the flow of a sheet-setting reception process.

DETAILED DESCRIPTION

1. Exemplary Embodiment

1.1. Overall Configuration of Image Forming Apparatus

Figure 1:
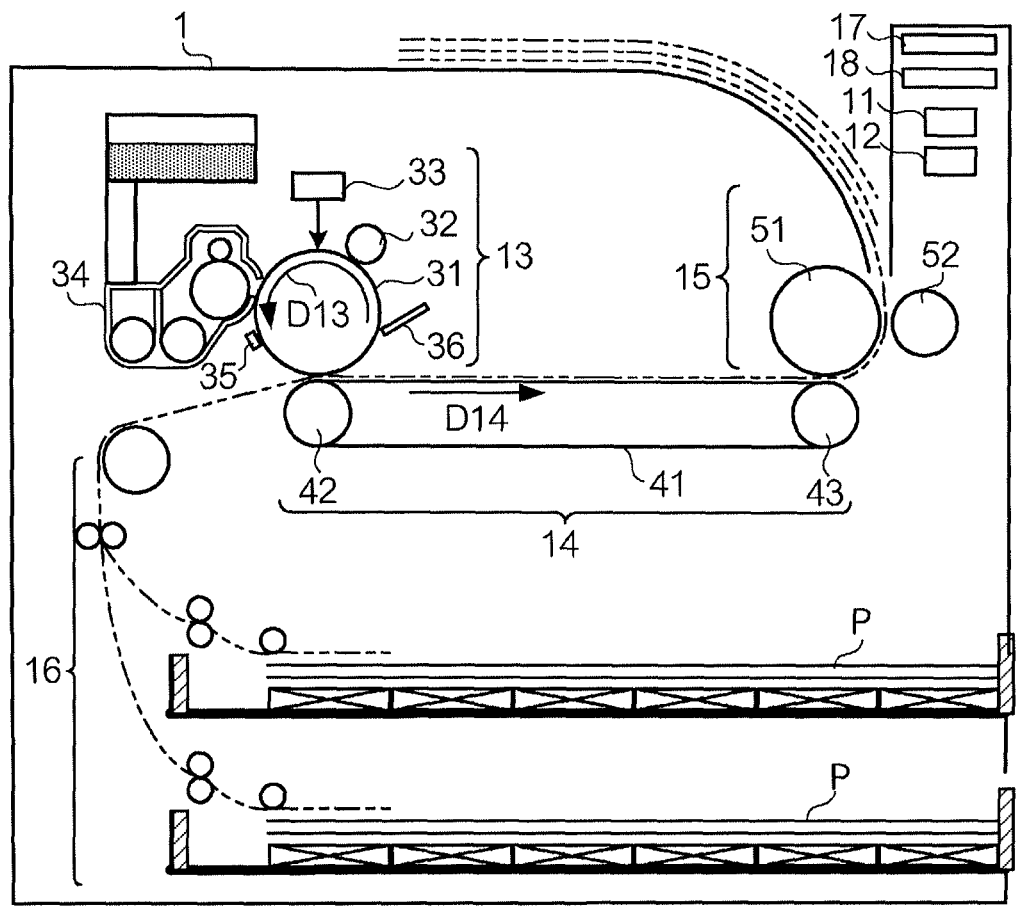
FIG. 1 illustrates the overall configuration of an image forming apparatus according to an exemplary embodiment.
Figure 2:
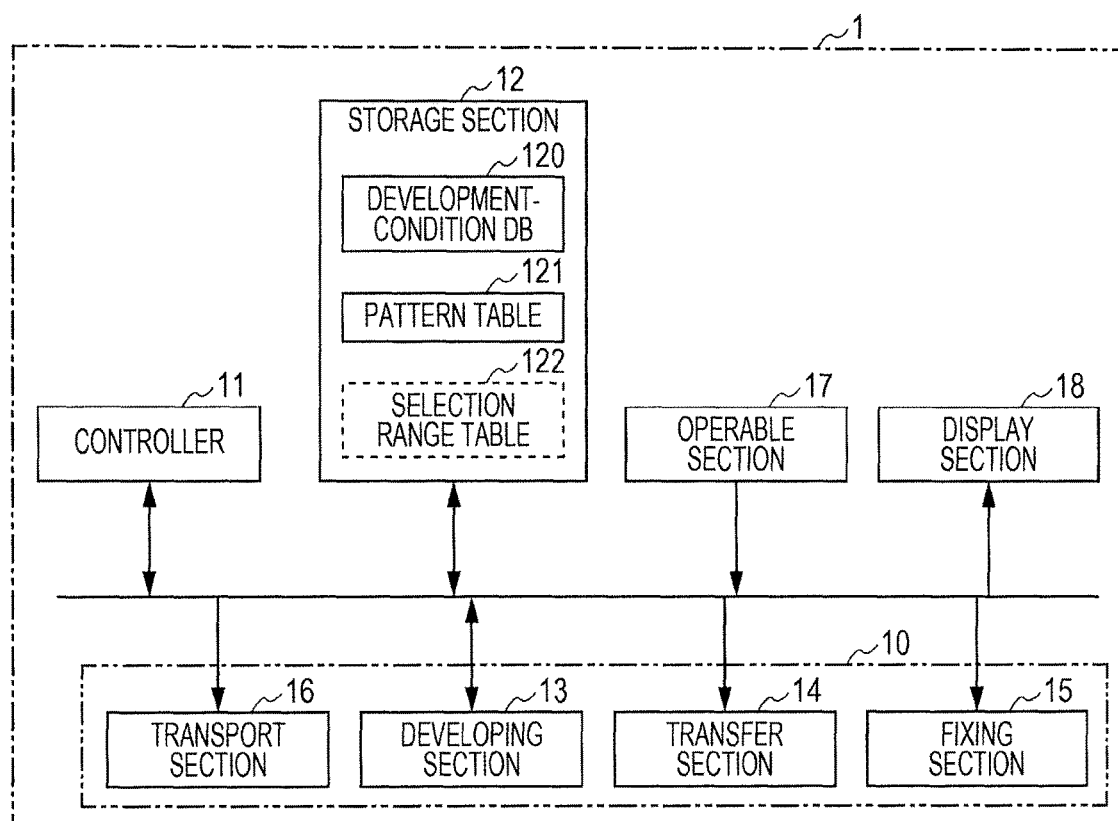
FIG. 2 is a block diagram illustrating the configuration of the image forming apparatus.

FIG. 1 illustrates the overall configuration of an image forming apparatus 1 according to this exemplary embodiment. FIG. 2 is a block diagram illustrating the configuration of the image forming apparatus 1. The image forming apparatus 1 forms an image by using a vertical cavity surface emitting laser (VCSEL). As shown in FIGS. 1 and 2, the image forming apparatus 1 has a controller 11, a storage section 12, an operable section 17, a display section 18, and an image forming section 10. The image forming section 10 has a developing section 13, a transfer section 14, a fixing section 15, and a transport section 16.

The controller 11 has a central processing unit (CPU), a read-only memory (ROM), and a random access memory (RAM). The CPU serves as a control device that reads and executes a computer program (which will simply be referred to as "program" hereinafter) stored in the ROM or the storage section 12 so as to control each section of the image forming apparatus 1.

The operable section 17 includes operators, such as operable buttons and a touchscreen, for inputting various kinds of commands. The operable section 17 receives user operation and supplies a signal according to the operation contents to the controller 11.

The display section 18 has a liquid crystal display and displays, for example, various kinds of information commanded by the controller 11. The touchscreen of the operable section 17 may be disposed over the liquid crystal display of the display section 18. In this case, the touchscreen is formed of a transparent material so as to allow the user to view an image displayed on the liquid crystal display of the display section 18.

The transport section 16 has a container and a transport roller. The container accommodates therein sheets P as media cut to a predetermined size. The sheets P accommodated in the container are fetched one-by-one by the transport roller in accordance with a command from the controller 11 and are transported to the transfer section 14 via a sheet transport path. The media are not limited to paper sheets and may be, for example, resinous sheets. In other words, the media may be of any type onto which images are recordable onto the surfaces thereof.

The developing section 13 includes an image bearing member 31, a charging unit 32, an exposure device 33, a developing unit 34, a measuring unit 35, and a drum cleaner 36. The image bearing member 31 has a charge generation layer and a charge transport layer and is rotated in a direction of an arrow D13 by a driver (not shown). The charging unit 32 electrostatically charges the surface of the image bearing member 31.

Figure 3A:
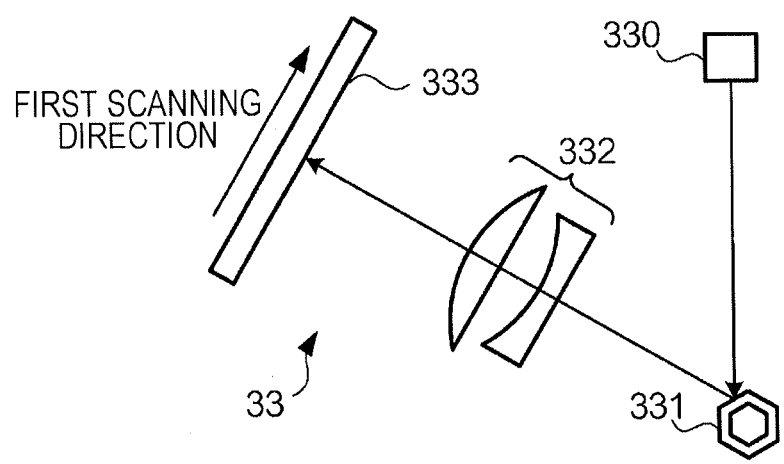
FIGS. 3A and 3B schematically illustrate an exposure device.
Figure 3B:
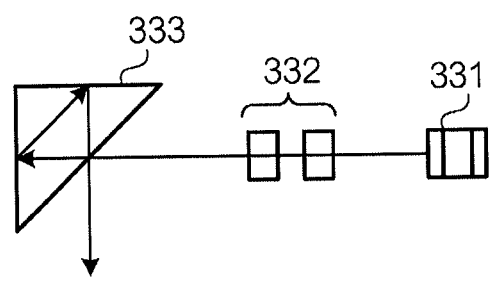
Figure 4A:
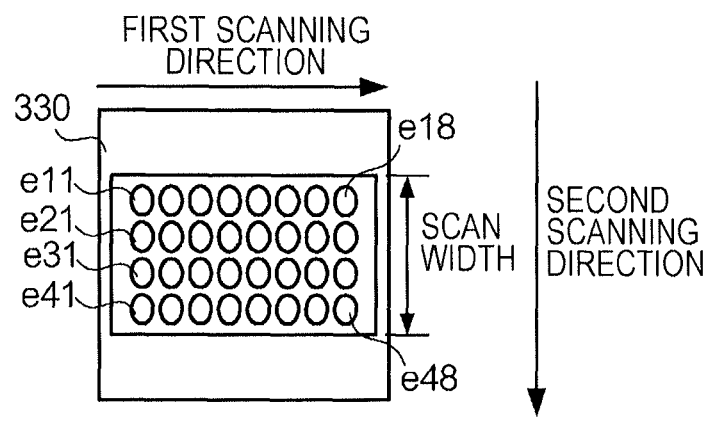
FIGS. 4A and 4B schematically illustrate a light source.
Figure 4B:
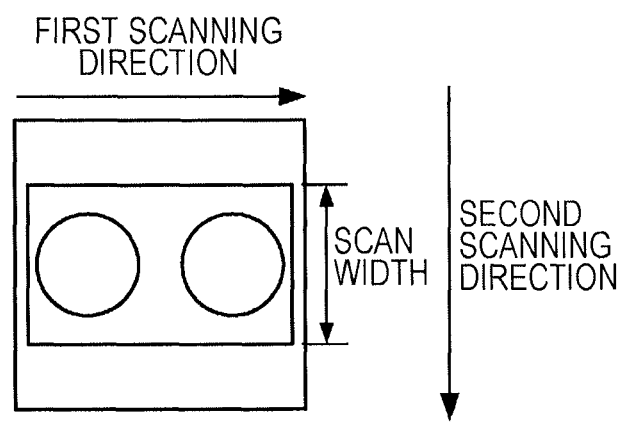

FIGS. 3A and 3B schematically illustrate the exposure device 33. As shown in FIG. 3A, the exposure device 33 has a light source 330, a polygonal mirror 331, a lens unit 332, and a reflecting mirror 333. FIGS. 4A and 4B schematically illustrate the light source 330.

The light source 330 shown in FIG. 4A is a vertical cavity surface emitting laser in which 32 light emitting members (e11 to e48) are two-dimensionally arranged over a surface of a substrate. Each light emitting member radiates light in a direction orthogonal to the substrate.

The light emitting members are arranged in a matrix of eight rows in a first scanning direction by four columns in a second scanning direction. Specifically, the light source 330 is an example of a light source having multiple light emitting members that emit light from different positions in the second scanning direction. In this case, four columns of light emitting members exist in a scan width, which is the traveling distance in the second scanning direction in a single scan.

In an edge emitting laser in the related art, one column of light emitting members (two rows=two light emitting members) are arranged in this scan width, as shown in FIG. 4B. Therefore, when the light source 330 shown in FIG. 4A is used, resolution that is four times that of the edge emitting laser in the related art is obtained. The light source 330 does not have to be a vertical cavity surface emitting laser so long as it is a light source having multiple light emitting members. The number and the arrangement of light emitting members included in the light source 330 are not limited to those in the example shown in FIG. 4A.

Under the control of the controller 11, the light source 330 radiates laser light based on a predetermined light emission pattern in accordance with an input image. A light emission pattern determines whether or not each of the multiple light emitting members included in the light source 330 is to emit light.

The polygonal mirror 331 shown in FIGS. 3A and 3B has mirrors on side surfaces of the polygonal prism. The mirrors reflect the laser light radiated from the light source 330. The polygonal mirror 331 is rotated by a motor (not shown) so as to scan the reflected laser light. The lens unit 332 is a lens group having so-called FO lenses and adjusts the scan speed of the laser light reflected by the polygonal mirror 331 and corrects an angle error of the laser light.

As shown in FIG. 3B, the reflecting mirror 333 reflects the laser light, which has passed through the lens unit 332, one or more times to change the traveling direction of the laser light, and guides the laser light to the image bearing member 31 electrostatically charged by the charging unit 32. Accordingly, the exposure device 33 radiates the laser light onto the electrostatically-charged surface of the image bearing member 31 so that a latent image is retained on the image bearing member 31.

The image described above may be read by the controller 11 from the storage section 12 in accordance with a command received as a result of the user operating the operable section 17, or may be acquired by the controller 11 from an external device via a communication unit (not shown). The external device is, for example, a reading device that reads an original image or a storage device that stores therein data indicating an image.

The developing unit 34 accommodates therein a two-component developer that contains a monochrome toner, such as a black toner, and a magnetic carrier, such as ferrite powder. The tips of a magnetic brush formed in the developing unit 34 come into contact with the surface of the image bearing member 31 so that the toner adheres to an area of the surface of the image bearing member 31 exposed to the laser light from the exposure device 33, whereby an image is formed (developed) on the image bearing member 31. Since the developing unit 34 shown in FIG. 1 supplies a monochrome toner, a monochrome image is formed on the image bearing member 31.

The measuring unit 35 measures the density of the image formed on the image bearing member 31 by using a light emitting element, such as a light emitting diode (LED), to radiate light onto the surface of the image bearing member 31 and by capturing the light reflected therefrom by using a light receiving element, such as a photodiode.

The drum cleaner 36 is, for example, a cleaning blade that removes non-transferred toner remaining on the surface of the image bearing member 31 after an image transfer process. Specifically, the drum cleaner 36 removes unwanted toner from the image bearing member 31 so as to prepare for a subsequent image forming process.

The transfer section 14 shown in FIG. 1 is a transfer device of a direct transfer type and has a belt 41, a transfer roller 42, and a belt transport roller 43. The transfer section 14 transfers the image formed by the developing section 13 onto a sheet P of a predetermined paper type set in accordance with user operation.

The belt 41 is an endless belt member that is extended between the transfer roller 42 and the belt transport roller 43. In accordance with a potential difference between the transfer roller 42 and the image bearing member 31 of the developing section 13, the transfer roller 42 transfers the image on the surface of the image bearing member 31 onto the sheet P transported from the transport section 16.

At least one of the transfer roller 42 and the belt transport roller 43 is rotated by a driver (not shown), thus causing the belt 41 to rotate. The sheet P having the image transferred thereon from the image bearing member 31 by the transfer roller 42 is transported in a direction of an arrow D14 by the rotating belt 41.

The fixing section 15 has a heating roller 51 and a pressing roller 52. The pressing roller 52 presses the sheet P transported by the belt 41 of the transfer section 14 onto the heating roller 51. The heating roller 51 heats the sheet P pressed by the pressing roller 52 so as to fix the image transferred on the sheet P. The sheet P having the image fixed thereon is ejected from an upper ejection port of the image forming apparatus 1 and is placed on a sheet tray. The image is output to the sheet P in accordance with the functions of these components of the image forming section 10.

The storage section 12 is a mass storage unit, such as a hard disk drive, and stores a program to be read by the CPU of the controller 11. Moreover, as shown in FIG. 2, the storage section 12 stores a development-condition database (DB) 120 and a pattern table 121.

Figures 5, 6:
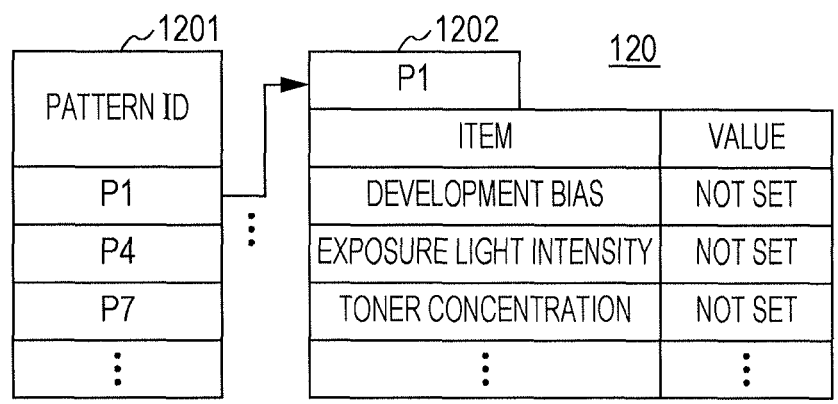
FIG. 5 illustrates an example of a development-condition database.
FIG. 6 illustrates an example of a pattern table.

FIG. 5 illustrates an example of the development-condition DB 120. The development-condition DB 120 is a database that has a list 1201 and a development-condition table 1202. The list 1201 has pattern IDs serving as identification information for candidate light emission patterns. The development-condition table 1202 has, for each pattern ID written in the list 1201, a combination of a development condition item and a development condition value to be applied to the light emission pattern identified based on that pattern ID.

The development condition items include, for example, a development bias, an exposure light intensity, and a toner concentration. A development bias is a voltage that the charging unit 32 applies between the image bearing member 31 and the developing unit 34. An exposure light intensity is the intensity of a light beam to be radiated from the light source 330. A toner concentration is the concentration of toner in the developer accommodated in the developing unit 34. In an initial state, the values in the development-condition table 1202 are not set.

FIG. 6 illustrates an example of the pattern table 121. In association with the pattern ID of each light emission pattern, the pattern table 121 has light-emitting-member IDs, which are pieces of identification information for light emitting members that are to actually emit light based on that light emission pattern. If a circle is given to the field of a light-emitting-member ID associated with a pattern ID, the light emitting member of that light-emitting-member ID emits light based on the light emission pattern of that pattern ID. If an "X" is given, light is not to be emitted from the light emitting member.

1.2. Functional Configuration of Controller

Figure 7:
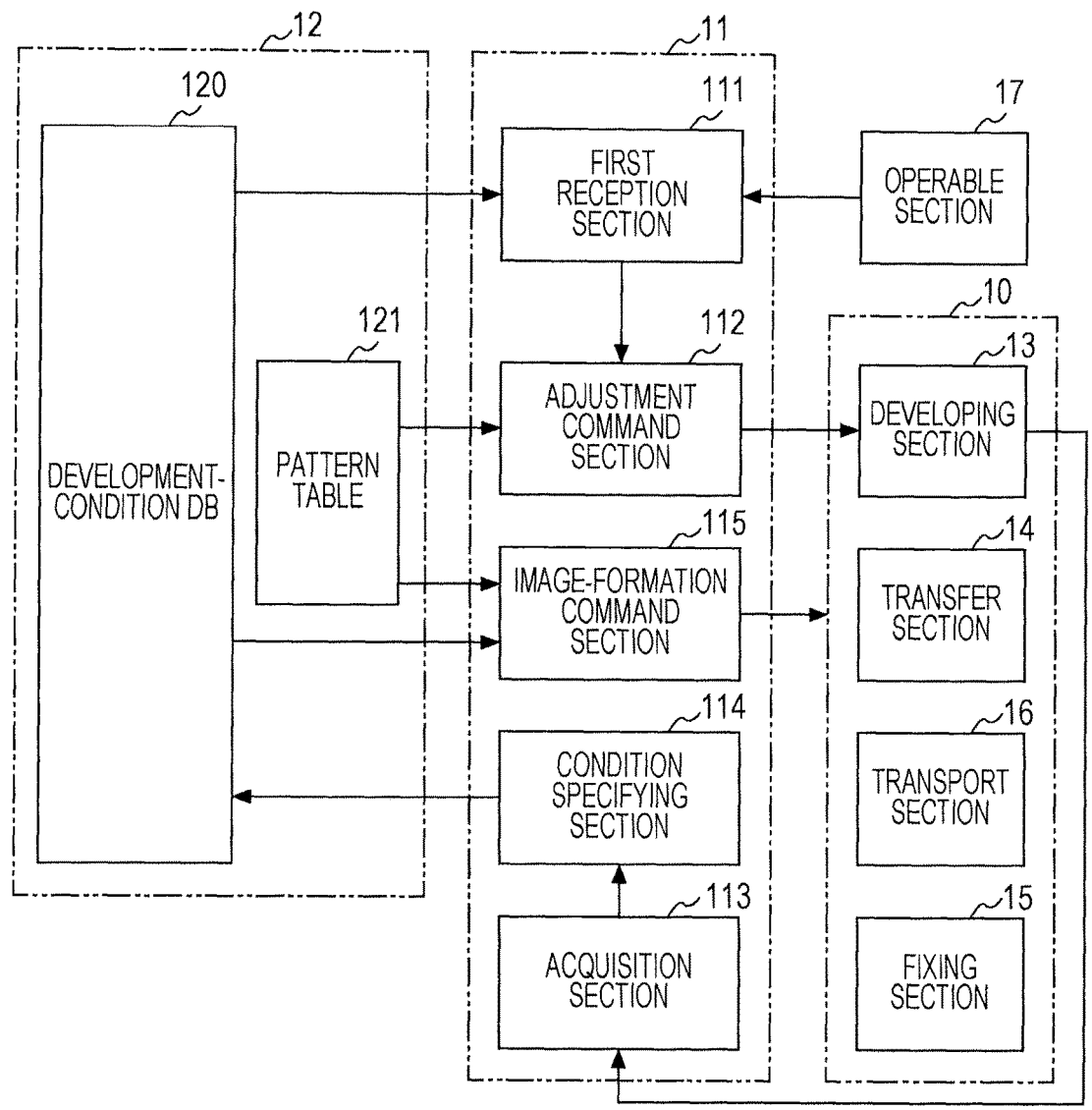
FIG. 7 illustrates a functional configuration of a controller that controls the image forming apparatus.

FIG. 7 illustrates a functional configuration of the controller 11 that controls the image forming apparatus 1. The controller 11 executes the aforementioned program so as to function as a first reception section 111, an adjustment command section 112, an acquisition section 113, a condition specifying section 114, and an image-formation command section 115.

When the user operates the operable section 17, the first reception section 111 receives the contents of the operation. If the operation received by the first reception section 111 designates test printing, which will be described later, or does not designate a light emission pattern, the first reception section 111 specifies a light emission pattern by sequentially reading a pattern ID from the list 1201 in the development-condition DB 120, reads the contents of the development-condition table 1202 associated with that light emission pattern, and specifies a development condition to be applied to that light emission pattern.

The adjustment command section 112 refers to the pattern table 121 and commands the image forming section 10 to perform a developing process based on the light emission pattern and the development condition specified by the first reception section 111. The image forming section 10 receiving this command causes the developing section 13 to form an adjustment image for the development condition onto the surface of the image bearing member 31. When the adjustment image is formed, the measuring unit 35 measures the density of the adjustment image. Specifically, the adjustment command section 112 commands the image forming section 10 to form a latent image based on an input image onto the image bearing member 31 by using the light source 330 having the multiple light emitting members.

The acquisition section 113 acquires a measurement value from the measuring unit 35, which has measured the density of the adjustment image formed on the image bearing member 31 in accordance with the command from the adjustment command section 112.

The condition specifying section 114 compares the acquired measurement value with a predetermined target value and changes the development condition so that the measurement value becomes closer to the target value.

When the development condition is changed, the adjustment command section 112 commands the developing section 13 to perform a developing process under the changed development condition, and the acquisition section 113 acquires a measurement value. The condition specifying section 114 causes the development-condition DB 120 to store the development condition corresponding to when the measurement value becomes close to a threshold value for the target value as a result of repeating the above process as a development condition corresponding to that light emission pattern. Specifically, the condition specifying section 114 specifies one development condition corresponding to one light emission pattern of the light source 330 based on the measurement value acquired by the acquisition section 113.

As described above, the development condition items include, for example, a development bias, an exposure light intensity, and a toner concentration. Specifically, when the measurement value acquired by the acquisition section 113 satisfies a predetermined condition, the condition specifying section 114 specifies at least one development condition from among the intensity of light to be emitted from the multiple light emitting members included in the light source 330, the concentration of the developer to be supplied by the developing section 13, and the voltage to be applied to the image bearing member 31.

The image-formation command section 115 refers to the development-condition DB 120 and the pattern table 121, sets a development condition in the development-condition table 1202 for each light emission pattern listed in the list 1201 in the development-condition DB 120, and commands the image forming section 10 to form and develop a latent image onto the image bearing member 31 based on an image input to the controller 11. Moreover, the image-formation command section 115 commands the transport section 16 to transport a sheet P, commands the transfer section 14 to transfer the image from the image bearing member 31 onto the sheet P, and commands the fixing section 15 to fix the image transferred on the sheet P. Consequently, the image formed on the image bearing member 31 based on the development condition specified for each light emission pattern is output to the sheet P. Specifically, the image-formation command section 115 commands the image forming section 10 to form multiple images onto the image bearing member 31 by using multiple light emission patterns and to output the images to sheets P in accordance with development conditions specified by the condition specifying section 114.

After the image-formation command section 115 commands the image forming section 10 to transfer and output the multiple images formed by using the aforementioned multiple light emission patterns onto the sheets P, the first reception section 111 receives a designation of a light emission pattern from the user. If the operation contents received by the first reception section 111 include a designation of a light emission pattern, the image-formation command section 115 commands the image forming section 10 to form an image onto the image bearing member 31 based on the designated light emission pattern and transfer and output that image onto a sheet P.

1.3. Operation of Image Forming Apparatus

Figure 8:
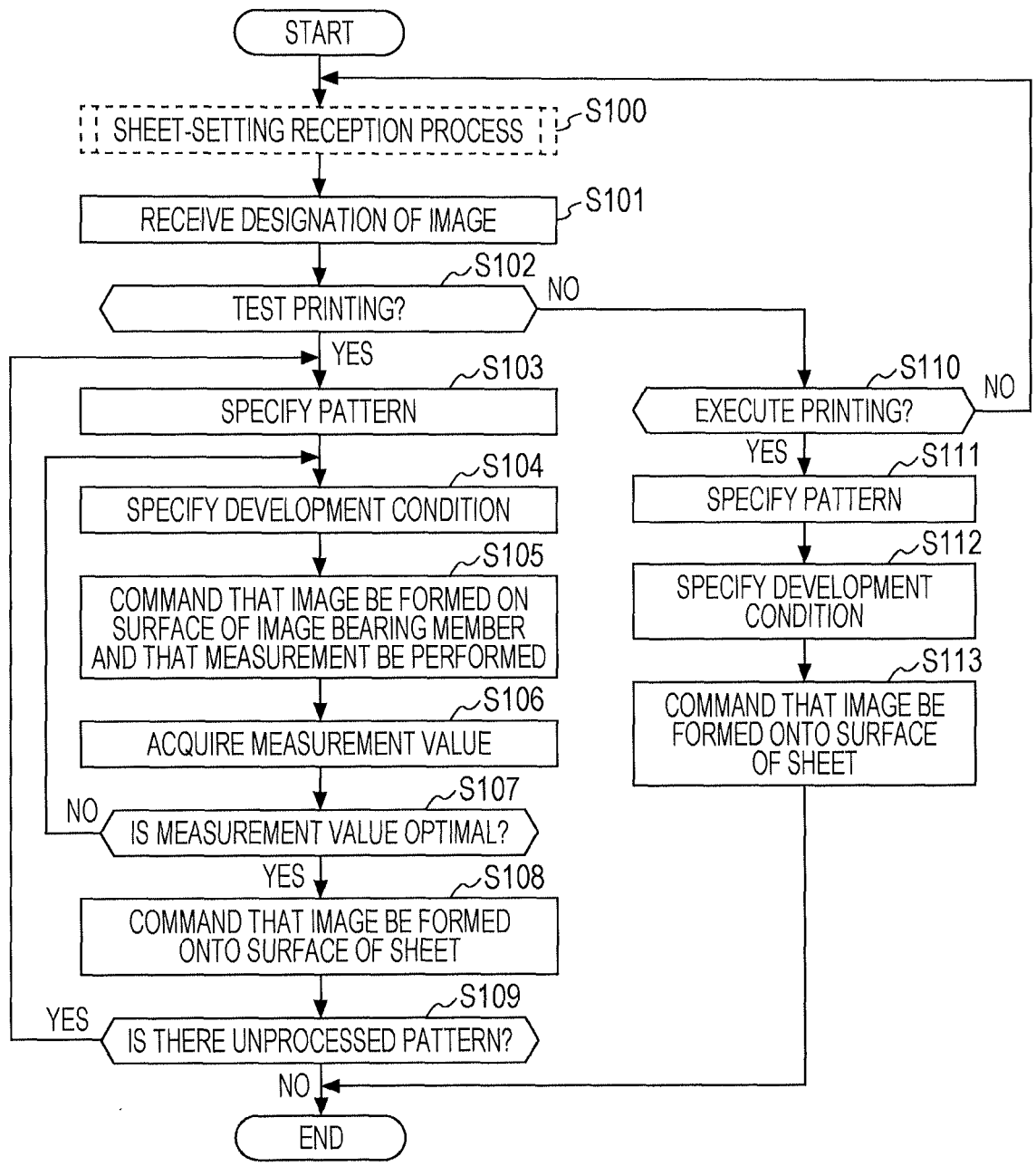
FIG. 8 is a flowchart illustrating the flow of the operation of the image forming apparatus.
Figure 9:
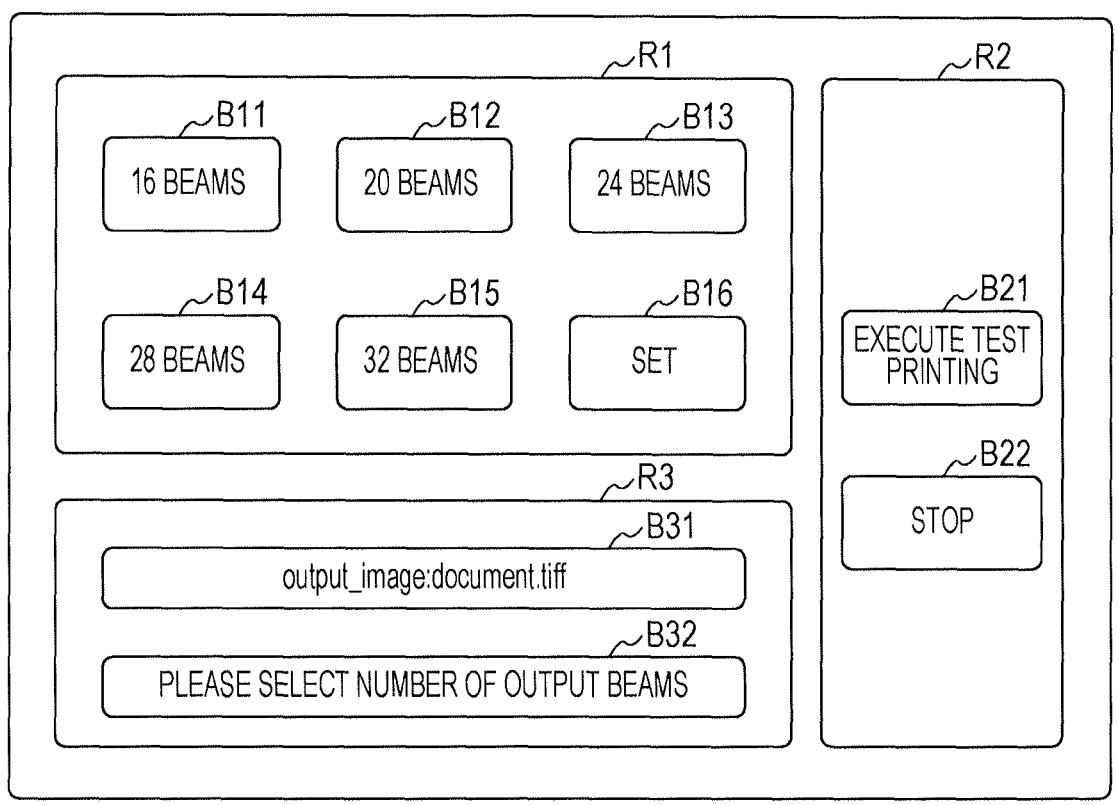
FIG. 9 illustrates an example of an operable screen displayed on a display section of the image forming apparatus.

FIG. 8 is a flowchart illustrating the flow of the operation of the image forming apparatus 1. FIG. 9 illustrates an example of an operable screen displayed on the display section 18 of the image forming apparatus 1. The controller 11 causes the display section 18 to display the operable screen shown in FIG. 9 and to receive user operation.

In the operable screen shown in FIG. 9, a region R1 is used for designating a light emission pattern. For example, a button B11 included in the region R1 is for controlling the light source 330 to cause 16 of 32 light emitting members to radiate "16" beams. The operable screen displays five candidate light emission patterns corresponding to buttons B11 to B15. A button B16 is to be used by the user for setting a light emission pattern by editing the light emission statuses of the individual light emitting members.

A region R2 is used for commanding that test printing be performed for forming an input image onto a sheet P based on each of the aforementioned five candidate light emission patterns. The region R2 has a button B21 for commanding that test printing be performed and a button B22 for stopping the test printing. When the user presses the button B21, test printing in which a light emission pattern is not designated is executed. When the user presses the button B22, the test printing is stopped.

A region R3 is for prompting the user to output an image as well as for presenting information. The region R3 has a button B31 for receiving an input of an image and displaying a file name, which is identification information, of the input image, and also has a message field B32 that displays a character string for prompting the user to press any of the buttons included in the region R1 to select the number of beams to be output.

When the user presses the button B31, the display section 18 changes to a dialog screen (not shown). When the user designates, on the dialog screen, a file name of an image to be output, the controller 11 receives the designation of the image in step S101. In step S102, the controller 11 determines whether or not the user operation indicates test printing. If it is determined that the user operation indicates test printing (YES in step S102), the controller 11 refers to the list 1201 in the development-condition DB 120, sequentially reads each of the listed pattern IDs, and specifies a light emission pattern in step S103.

The controller 11 that has specified the light emission pattern specifies a development condition associated with that light emission pattern from the development-condition table 1202 in the development-condition DB 120 in step S104. In step S105, the controller 11 then commands the developing section 13 to form an adjustment image onto the surface of the image bearing member 31 and to measure the density of the image formed on the surface.

When the controller 11 acquires a measurement value from the measuring unit 35 of the developing section 13 in step S106, the controller 11 compares the measurement value with a predetermined target value and determines whether or not the measurement value is an optimal value in step S107. If it is determined that the acquired measurement value is not an optimal value (NO in step S107), the controller 11 returns the process to step S104. In step S104, the controller 11 changes the contents written in the development-condition table 1202 in the development-condition DB 120 so as to specify a new development condition.

In contrast, if it is determined that the acquired measurement value is an optimal value (YES in step S107), the controller 11 stores the current development condition into the development-condition DB 120 in association with the current light emission pattern and commands the transfer section 14, the transport section 16, and the fixing section 15 in addition to the developing section 13 to form the input image onto the sheet P by using the light source 330 emitting light based on the development condition and the light emission pattern in step S108.

In step S109, the controller 11 determines whether or not there is an unprocessed pattern ID written in the list 1201 in the development-condition DB 120. If it is determined that there is an unprocessed pattern ID (YES in step S109), the controller 11 returns the process to step S103. In step S103, a light emission pattern identified based on the unprocessed pattern ID is specified.

In contrast, if it is determined that there is no unprocessed pattern ID (NO in step S109), the controller 11 ends the process.

If it is determined that the user operation does not indicate test printing (NO in step S102), the controller 11 determines whether or not the relevant operation designates a light emission pattern and indicates a command for executing printing in step S110. If it is determined that the user operation does not designate a light emission pattern and does not indicate a command for executing printing (NO in step S110), the controller 11 returns the process to the step prior to step S101.

In contrast, if it is determined that the user operation designates a light emission pattern and indicates a command for executing printing (YES in step S110), the controller 11 specifies the designated light emission pattern in step S111 and specifies a development condition associated with that light emission pattern in the development-condition DB 120 in step S112. Then, the controller 11 commands that the input image be formed on the sheet P by using the light source 330 emitting light based on the specified development condition and the specified light emission pattern in step S113 and ends the process.

As a result of the above-described process, the user obtains sheets P having images formed thereon based on optimal development conditions respectively for multiple candidate light emission patterns. The user may visually compare the images formed on the sheets P and select a less-disordered light emission pattern. Specifically, when one light emission pattern is not designated, the controller 11 of the image forming apparatus 1 may command the image forming section 10 to form multiple latent images based on an image input by the user onto the image bearing member 31 in accordance with different light emission patterns, develop the latent images, and output the multiple developed images onto the sheets P. Then, after the multiple images are output, the controller 11 may receive a designation of a light emission pattern selected by the user from among the aforementioned candidate light emission patterns. Accordingly, when forming an image using a light source having multiple light emitting members, a light emission pattern suitable for the characteristics of the image is specified.

2. Modifications

Although the exemplary embodiment has been described above, the contents of this exemplary embodiment may be modified as follows. Moreover, the following modifications may be combined.

2.1. First Modification

In the above-described exemplary embodiment, if an image is designated without designating a light emission pattern, the image forming apparatus 1 forms an image onto a sheet P based on a light emission pattern whose pattern ID is written in the list 1201 in the development-condition DB 120. Alternatively, the image forming apparatus 1 may receive a designation of an image forming condition. In this case, the storage section 12 of the image forming apparatus 1 may store a selection range table 122 indicated by a dashed line in FIG. 2.

FIG. 10 illustrates an example of the selection range table 122. The selection range table 122 indicates the range of candidate light emission patterns for each image forming condition. For example, in the example shown in FIG. 10, a sheet ID indicating the type of sheet P is indicated as an image forming condition in the selection range table 122. The type of sheet P indicated by a sheet ID is, for example, the size or the basis weight thereof.

In the selection range table 122, multiple pattern IDs corresponding to each sheet ID are each given a circle or an "X" indicating whether or not the light emission pattern identified based on that pattern ID is a candidate. If a pattern ID is given a circle, the light emission pattern identified based on that pattern ID is a candidate. If a pattern ID is given an "X", the light emission pattern identified based on that pattern ID is not a candidate.

FIG. 11 illustrates a functional configuration of a controller 11 according to this modification. The controller 11 executes a program read from the storage section 12 so as to function as a second reception section 116, a range specifying section 117, and a presentation command section 118.

The second reception section 116 receives a designation of a condition for forming an image onto a sheet P. In this case, a sheet ID indicating the type of sheet P is designated as the condition. The range specifying section 117 refers to the selection range table 122 and specifies candidates for multiple light emission patterns associated with the designated sheet ID. Specifically, the range specifying section 117 specifies the range of patterns based on which the light emitting members of the light source 330 emit light in accordance with the condition indicated by the designation received by the second reception section 116. The range specifying section 117 writes the specified range into the list 1201 in the development-condition DB 120.

When the candidate light emission patterns are specified by being read from the list 1201 in the development-condition DB 120, the presentation command section 118 commands the display section 18 to display the pattern IDs of these light emission patterns. Specifically, the presentation command section 118 commands the display section 18 (presenting device) to display (present) the range specified by the range specifying section 117. The display section 18 is merely an example of a component that presents the aforementioned range in accordance the command from the presentation command section 118, and this component that presents the range is not limited to the display section 18. For example, the image forming apparatus 1 may have a reproducing unit that presents this range to the user by reproducing audio obtained by reading out aloud each of the names of the candidate light emission patterns included in this range.

In this modification, when the user commands that a sheet P be set by operating the operable section 17, the controller 11 of the image forming apparatus 1 performs a sheet-setting reception process (step S100), as indicated by a dashed line in FIG. 8.

FIG. 12 is a flowchart illustrating the flow of the sheet-setting reception process. When the user performs operation for commanding that a sheet P be set, the controller 11 receives a sheet designation indicated by the operation in step S201, specifies a sheet ID, which is identification information of the sheet P, and refers to the selection range table 122 so as to specify a light emission pattern range corresponding to the sheet ID in step S202. When the light emission pattern range is specified, the controller 11 commands the display section 18 to present the range in step S203 and ends the process.

For example, the specified light emission pattern range is displayed by being allocated to the buttons B11 to B15 in the operable screen shown in FIG. 9. The user viewing this operable screen confirms that the light emission pattern range is set in accordance with the sheet ID designated by the user.

The type of sheet P indicated by the sheet ID is, for example, the size or the basis weight thereof and often affects the time it takes for toner transfer and toner fixation. Therefore, in the image forming apparatus 1, each sheet ID is associated with the transport speed of the sheet P in advance. If the transport speed exceeds a threshold value, some of the light emitting members of the light source 330 are caused not to emit light, sometimes making it difficult to perform a developing process. Therefore, with regard to a sheet P for which the transport speed is set to be higher than the threshold value, the number of light emitting members that are to emit light in association with the relevant sheet ID is set to be larger than that for a sheet P for which the transport speed is lower than the above set transport speed. Accordingly, the image forming apparatus 1 makes the user select a light emission pattern range suitable for the image forming condition even when the number of candidate light emission patterns is limited.

The second reception section 116 may receive a condition other than a designation of a sheet ID. For example, the second reception section 116 may receive a designation for collectively forming two images onto a single sheet P or a designation for prioritizing toner amount over image quality.

Furthermore, the second reception section 116 may receive a designation of the transport speed of a sheet P. Specifically, the second reception section 116 may receive a designation of a condition related to the speed at which a medium is transported.

Moreover, the second reception section 116 may receive a designation of a condition related to a screen of an input image as the above-described image forming condition. In this case, a screen expresses an intermediate color by using halftone dots. An input image may sometimes be pre-screened before the image is input. There are some screens that are known in advance to interfere with any of the light emission patterns due to, for example, the number of lines thereof. The selection range table 122 has written therein candidates for light emission patterns for each screen, and the controller 11 refers to the selection range table 122 to narrow down the candidates for light emission patterns so that interference fringes known to occur in advance may be avoided.

2.2. Second Modification

Although the image forming apparatus 1 according to the above-described exemplary embodiment forms an input image onto a sheet P, the image forming apparatus 1 may add the pattern ID of the light emission pattern for the light emitting members used for forming this image to this image and form the image onto the sheet P. Specifically, the image-formation command section 115 may command the image forming section 10 to add the pattern ID for identifying the light emission pattern for the light emitting members to each of multiple images, form the image onto the image bearing member 31, and output the image to the sheet P.

2.3. Third Modification

In the above-described exemplary embodiment, the developing section 13 is configured to form a monochrome image onto the image bearing member 31 by using the developing unit 34 that supplies a monochrome toner. Alternatively, the developing section 13 may be configured to use multiple developing units to form a color image onto a sheet P by using toners of multiple colors. In this case, the developing section 13 may be of a tandem type in which multiple image bearing members 31 are arranged in the moving direction of a transfer belt. In the case where the developing section 13 is configured to form an image by using toners of multiple colors, a development condition may be set for each of these colors.

Furthermore, in the above-described exemplary embodiment, the transfer section 14 transfers an image onto a sheet P, which is a medium, directly from the image bearing member 31 of the developing section 13 based on a direct transfer method. Alternatively, the transfer section 14 may be configured to perform the transfer process based on an indirect transfer method. In this case, the transfer section 14 may have an intermediate transfer member, such as an intermediate transfer belt, which transfers an image formed on the image bearing member 31, and may transfer the transferred image onto a medium, such as a sheet P, from this intermediate transfer member.

2.4. Fourth Modification

The program to be executed by the controller 11 of the image forming apparatus 1 may be provided in a stored state in a computer readable storage medium, which may be, for example, a magnetic storage medium, such as a magnetic tape or a magnetic disk; an optical storage medium, such as an optical disk; a magneto-optical storage medium; or a semiconductor memory. Furthermore, this program may be downloaded via a communication line, such as the Internet. As a controller described above as the controller 11, various types of devices other than the CPU may be used. For example, a dedicated processor may be used.

2.5. Fifth Modification

In the above-described exemplary embodiment, every time the user performs operation that indicates test printing, the controller 11 of the image forming apparatus 1 forms an adjustment image onto the image bearing member 31, measures the density thereof, changes the development condition until the measurement value becomes an optimal value, and specifies an optimal development condition corresponding to each light emission pattern. Alternatively, this development-condition specifying process does not have to be performed every time test printing is to be performed. In this case, the controller 11 may directly specify a development condition stored in the development-condition DB 120, and the controller 11 may proceed to step S108 after step S104 in FIG. 8. Furthermore, in this case, the controller 11 does not have to function as the adjustment command section 112, the acquisition section 113, and the condition specifying section 114.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
   an image-formation command section that commands an image forming section, comprising a laser light source including a plurality of light emitting members on a single substrate, an image bearing member, and a light deflector to scan the laser light emitted from the laser light source on the image bearing member, to form a plurality of latent images based on one input image onto the image bearing member, in accordance with a plurality of different light emission patterns by using the laser light source including the plurality of light emitting members,
   develop the plurality of latent images to form a plurality of developed images on the image bearing member, and
   transfer the plurality of developed images from the image bearing member to a medium; and
   a first reception section that receives a designation by a user with respect to one of the plurality of different light emission patterns after the plurality of developed images are transferred to the medium, wherein an image forming condition is being set based on a designated pattern, and
   wherein each light emission pattern indicates which of the plurality of light emitting members included in the laser light source is to emit light.

2. The control device according to claim 1, further comprising:
   a second reception section that receives a designation of a condition for forming an image onto the medium;
   a range specifying section that specifies a range including candidates for the plurality of different light emission patterns in accordance with the condition indicated by the designation received by the second reception section; and
   a presentation command section that commands a presenting device to present the range specified by the range specifying section.

3. The control device according to claim 2, wherein the second reception section receives a designation of a condition related to a speed at which the medium is transported.

4. The control device according to claim 2, wherein the second reception section receives the designation of the condition by the user operating a display screen of a display.

5. The control device according to claim 1, further comprising:
   an adjustment command section that commands the image forming section to form the plurality of latent images on the image bearing member based on a predetermined adjustment image in accordance with the plurality of different light emission patterns by using the laser light source, and develop the plurality of latent images based on the predetermined adjustment image to produce the plurality of developed images;
   an acquisition section that acquires a measurement value obtained by measuring a density of an image to be formed on the image bearing member in accordance with a command from the adjustment command section; and
   a condition specifying section that specifies one development condition corresponding to one of the plurality of different light emission patterns of the laser light source based on the measurement value acquired by the acquisition section,
   wherein the image-formation command section commands the image forming section to form the plurality of latent images based on the predetermined adjustment image onto the image bearing member in accordance with the plurality of different light emission patterns under the one development condition, which is specified by the condition specifying section and corresponds to the one of the plurality of different light emission patterns,
   develop the plurality of latent images based on the predetermined adjustment image to produce the plurality of developed images based on the predetermined adjustment image, and
   transfer the plurality of developed images based on the predetermined adjustment image to the medium.

6. The control device according to claim 5, wherein if the measurement value acquired by the acquisition section satisfies a predetermined condition, the condition specifying section specifies the one development condition from among an intensity of light to be emitted from the plurality of light emitting members included in the laser light source, a concentration of a developer to be supplied by the image forming section, and a voltage to be applied to the image bearing member.

7. The control device according to claim 1, wherein the image-formation command section commands the image forming section to add identification information, which is for identifying one of the plurality of different light emission patterns that has caused the plurality of light emitting members to emit light, to each of the plurality of latent images and form the plurality of latent images onto the image bearing member, and transfer the plurality of developed images to the medium.

8. An image forming apparatus comprising:
an image forming section comprising a laser light source including a plurality of light emitting members on a single substrate that emit light, an image bearing member, and a light deflector to scan the laser light emitted from the laser light source on the image bearing member and a developing unit that supplies a developer to the image bearing member;
an image-formation command section that commands the image forming section to form a plurality of latent images based on one input image onto the image bearing member in accordance with a plurality of different light emission patterns by using the laser light source,
develop the plurality of latent images to form a plurality of developed images on the image bearing member, and
transfer the plurality of developed images from the image bearing member to a medium; and
a first reception section that receives a designation by a user with respect to one of the plurality of different light emission patterns after the plurality of developed images are transferred to the medium, wherein an image forming condition is being set based on a designated pattern, and
wherein each light emission pattern indicates which of the plurality of light emitting members included in the laser light source is to emit light.

9. The image forming apparatus according to claim 8, wherein the plurality of light emitting members included in the laser light source emit light from different positions in a predetermined scanning direction.

10. A non-transitory computer readable medium storing a program causing a computer to execute a control process, the control process comprising:
commanding an image forming section, comprising a laser light source including a plurality of light emitting members on a single substrate, an image bearing member, and a light deflector to scan the laser light emitted from the laser light source on the image bearing member, to form a plurality of latent images based on one input image onto the image bearing member in accordance with a plurality of different light emission patterns by using the laser light source including the plurality of light emitting members,
develop the plurality of latent images to form a plurality of developed images on the image bearing member, and
transfer the plurality of developed images from the image bearing member to a medium; and
receiving a designation by a user with respect to one of the plurality of different light emission patterns after the plurality of developed images are transferred to the medium, wherein an image forming condition is being set based on a designated pattern, and
wherein each light emission pattern indicates which of the plurality of light emitting members included in the laser light source is to emit light.

11. A control method comprising:
commanding an image forming section, comprising a laser light source including a plurality of light emitting members on a single substrate, an image bearing member, and a light deflector to scan the laser light emitted from the laser light source on the image bearing member, to
form a plurality of latent images based on one input image onto the image bearing member, in accordance with a plurality of different light emission patterns by using the laser light source including the plurality of light emitting members,
develop the plurality latent images to form a plurality of developed images on the image bearing member, and
transfer the plurality of developed images from the image bearing member to a medium; and
receiving a designation by a user with respect to one of the plurality of different light emission patterns after the plurality of developed images are transferred to the medium,
wherein an image forming condition is being set based on a designated pattern, and
wherein each light emission pattern indicates which of the plurality of light emitting members included in the laser light source is to emit light.

* * * * *